United States Patent
Thomas et al.

(10) Patent No.: US 10,286,850 B2
(45) Date of Patent: *May 14, 2019

(54) INTEGRATED CENTER CONSOLE LATCH OPENING CLOSE-OUT FEATURE

(71) Applicant: FORD GLOBAL TECHNOLOGIES, LLC, Dearborn, MI (US)

(72) Inventors: Gregory Paul Thomas, Canton, MI (US); Marie L. Hall, Monroe, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 111 days.

This patent is subject to a terminal disclaimer.

(21) Appl. No.: 15/472,543

(22) Filed: Mar. 29, 2017

(65) Prior Publication Data
US 2017/0204640 A1    Jul. 20, 2017

Related U.S. Application Data

(63) Continuation of application No. 14/868,598, filed on Sep. 29, 2015, now Pat. No. 9,643,541.

(51) Int. Cl.
*B60R 7/04* (2006.01)
*B60R 13/02* (2006.01)
*E05B 83/32* (2014.01)

(52) U.S. Cl.
CPC ............ *B60R 7/04* (2013.01); *B60R 13/0275* (2013.01); *E05B 83/32* (2013.01)

(58) Field of Classification Search
CPC .. B60N 3/08; B60N 3/101; B60R 7/04; B60R 7/043; B60R 7/046; B60R 13/0275

USPC .................................. 296/24.3, 24.34, 37.8
See application file for complete search history.

(56) References Cited

U.S. PATENT DOCUMENTS

| | | |
|---|---|---|
| 5,076,641 A | 12/1991 | Lindberg |
| 5,639,002 A | 6/1997 | Weitbrecht et al. |
| 5,997,082 A | 12/1999 | Vincent et al. |
| 6,045,173 A | 4/2000 | Tiesler et al. |
| 6,719,367 B2 | 4/2004 | Mic et al. |
| 7,721,926 B2 | 5/2010 | Thomas |
| 7,748,762 B2 | 7/2010 | Mayne, Jr. |
| 7,823,949 B2 | 11/2010 | Vandenheuvel et al. |
| 7,922,228 B2 | 4/2011 | Spitler et al. |
| 8,231,164 B2 | 7/2012 | Schubring et al. |
| 2008/0073927 A1 | 3/2008 | Schoemann et al. |
| 2011/0215605 A1 | 9/2011 | Spitler et al. |
| 2014/0197657 A1 | 7/2014 | Gillis et al. |

FOREIGN PATENT DOCUMENTS

WO    2001038678 A1    5/2001

*Primary Examiner* — Jason S Daniels
(74) *Attorney, Agent, or Firm* — Vichit Chea; King & Schickli PLLC

(57) ABSTRACT

A storage bin shell for a vehicle includes a main bin portion defining a storage bin having a latch opening and an integrated latch opening close-out member configured to provide a latch opening close-out. The integrated latch opening close-out member includes a hinged portion, which may be a living hinge. The hinged portion further includes a retainer for engaging a co-operating receiver defined in the main bin portion, whereby rotating or folding the hinged portion allows engaging the co-operating receiver by the retainer to define the latch opening close-out.

17 Claims, 3 Drawing Sheets

INTEGRATED CENTER CONSOLE LATCH OPENING CLOSE-OUT FEATURE

This application is a continuation of U.S. patent application Ser. No. 14/868,598 filed on 29 Sep. 2015, now U.S. Pat. No. 9,643,541.

TECHNICAL FIELD

This disclosure relates generally to vehicle consoles including latching storage bins. More particularly, the disclosure relates to an integrated close-out feature for a vehicle console latch opening.

BACKGROUND

During fabrication of a vehicle console including a latching storage bin (typically by injection and/or compression molding) an opening is provided in the console bin structure to provide a lid latch engagement area and to allow necessary latch swing clearance. While this opening could be simply left open, this is undesirable for aesthetic reasons. Moreover, a latch opening provides an avenue for lost and potentially un-retrievable objects, leading to further customer dissatisfaction. Accordingly, it is known to provide a latch opening close-out to occlude the latch opening when providing a finished vehicle console bin.

Conventionally, this is done by manufacturing and inserting a separate molded latch opening close-out. Disadvantageously, providing such a separate piece incurs additional materials and associated costs, including costs of tooling, manufacturing materials, the cost of manufacturing floor space required for the tooling, and labor costs in manufacturing/installing the close-out.

To solve this and other problems, the present disclosure relates at a high level to an integrated console latch opening close-out for a console latching storage bin, to consoles incorporating the integrated close-out, and to tooling for fabricating the close-out.

SUMMARY

In accordance with the purposes and benefits described herein, in one aspect a vehicle storage compartment such as for a latching storage bin is provided, including a main bin portion and an integral latch opening close-out member. The integral close-out member includes a hinged portion which when rotated or folded defines a close-out for a latch opening of the latching storage bin. In embodiments, the hinged portion includes a living hinge defined in the main bin portion/integral latch opening close-out member during a fabrication process. A retainer may be defined in the hinged portion for engaging a co-operating receiver defined in the main bin portion during the fabrication process. Engagement of the retainer by the co-operating receiver in turn defines the latch opening close-out.

In the following description, there are shown and described embodiments of the disclosed integrated console latch opening close-out. As it should be realized, the device is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed integrated console latch opening close-out, and together with the description serve to explain certain principles thereof. In the drawings.

Reference will now be made in detail to embodiments of the disclosed integrated console latch opening close-out, examples of which are illustrated in the accompanying drawing figures wherein like reference numerals identify like features.

DETAILED DESCRIPTION

Preliminarily, the descriptions and drawing figures herein are primarily directed for convenience to a vehicle center console having a storage bin with a hinged lid and latch therefor. However, it will be appreciated that the descriptions should not be taken to be limiting to a center console, and that the described integrated latch opening close-out is readily adaptable to any vehicle console storage bin or other storage bin including a latching lid.

Figure 1:
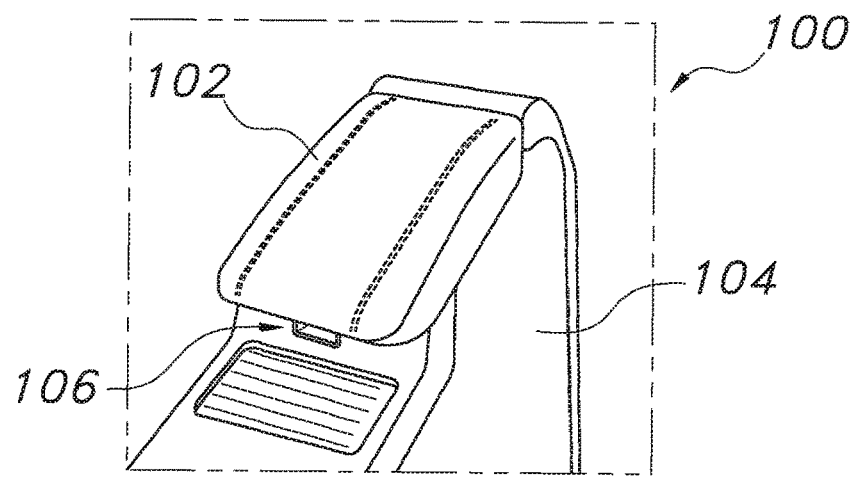
FIG. 1 depicts a prior art latching storage bin for a vehicle console, including a latch opening disposed below a latching storage bin lid.

Reference is now made to FIG. 1 schematically illustrating a conventional vehicle center console bin 100 including a latching lid/armrest 102 and an underlying bin structure 104. As seen therein, a latch opening 106 is defined in the fabricated part. As summarized above, typically this latch opening 106 is provided with a close-out (not shown in this view) for aesthetic reasons and to prevent loss of items through the opening 106. This close-out is ordinarily a piece that is separately manufactured/molded from the other components of the console bin 100, with attendant increases in manufacturing and labor costs as summarized above.

Figure 2:
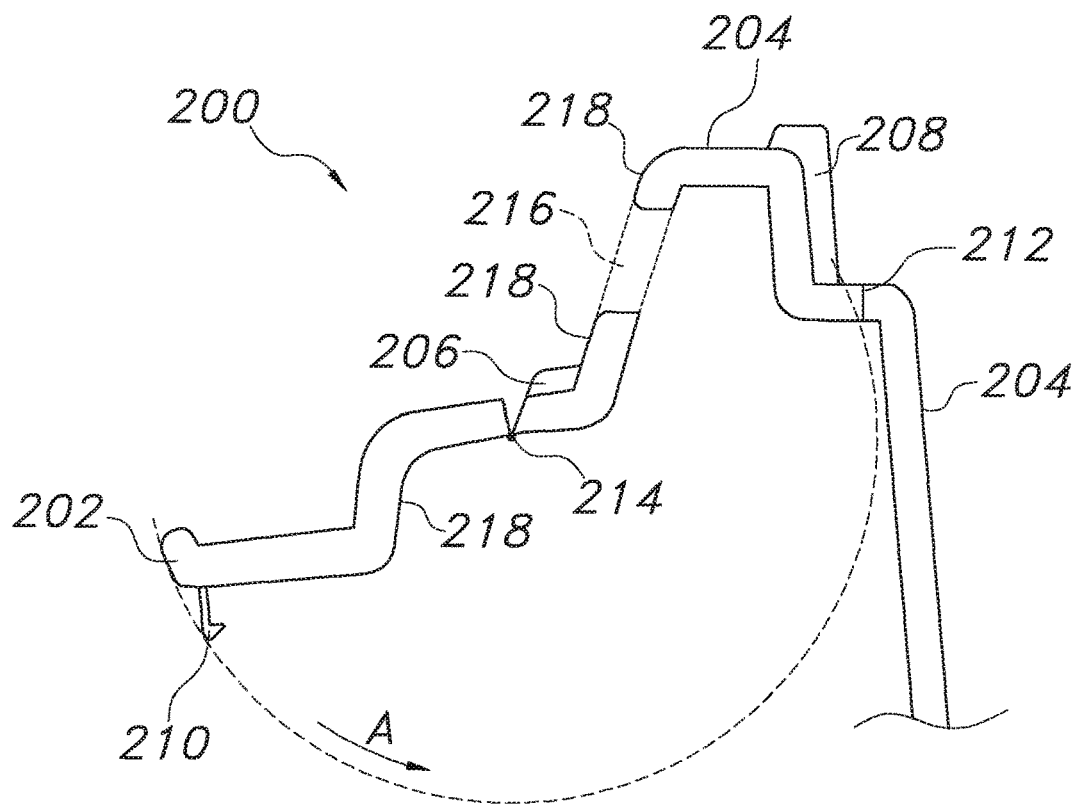
FIG. 2 depicts a storage bin shell according to the present disclosure in an as-fabricated configuration.

To address this problem, as shown in FIG. 2 a console storage bin shell 200 including an integrated latch opening close-out manufactured such as by injection and/or compression molding as an integral piece. The console bin shell 200 as fabricated includes a close-out member 202 and a main bin member 204. For convenience in description, the remainder of the storage bin is not depicted in the drawing figure. However, the basic structure of a console storage bin is well known to the skilled artisan. The console storage bin shell 200 further includes a close-out member tuning rib element 206 and a main bin member tuning rib element 208, the purpose of which will be discussed further below. Still more, as fabricated the close-out member 204 includes a retainer 210 which, as will be described, engages a co-operating main bin member receiver 212 to define the described latch opening close-out. In the depicted embodiment, retainer 210 defines a hook or J shape for engaging the cooperating receiver 212. However, the skilled artisan will readily appreciate that other suitable configurations are possible for retainer 210, and are contemplated for use herein. As fabricated, the console bin shell 200 defines a latch opening area 216.

The close-out member 202 further includes a hinged portion 214 allowing rotation/folding of a portion of the close-out member 202. As will be discussed, by the rotation/folding of the hinged portion 214, retainer 210 is rotated or pivoted (see arrow A) to engage main bin member receiver 212. As depicted, hinged portion 214 is provided as a living hinge, which is a structure well known to the skilled artisan. However, it is contemplated to provide any suitable hinge structure to allow close-out member 202 to rotate/fold such that retainer 210 engages main bin member receiver 212, and so this portion of the disclosure should not be taken as limiting.

Figure 3:
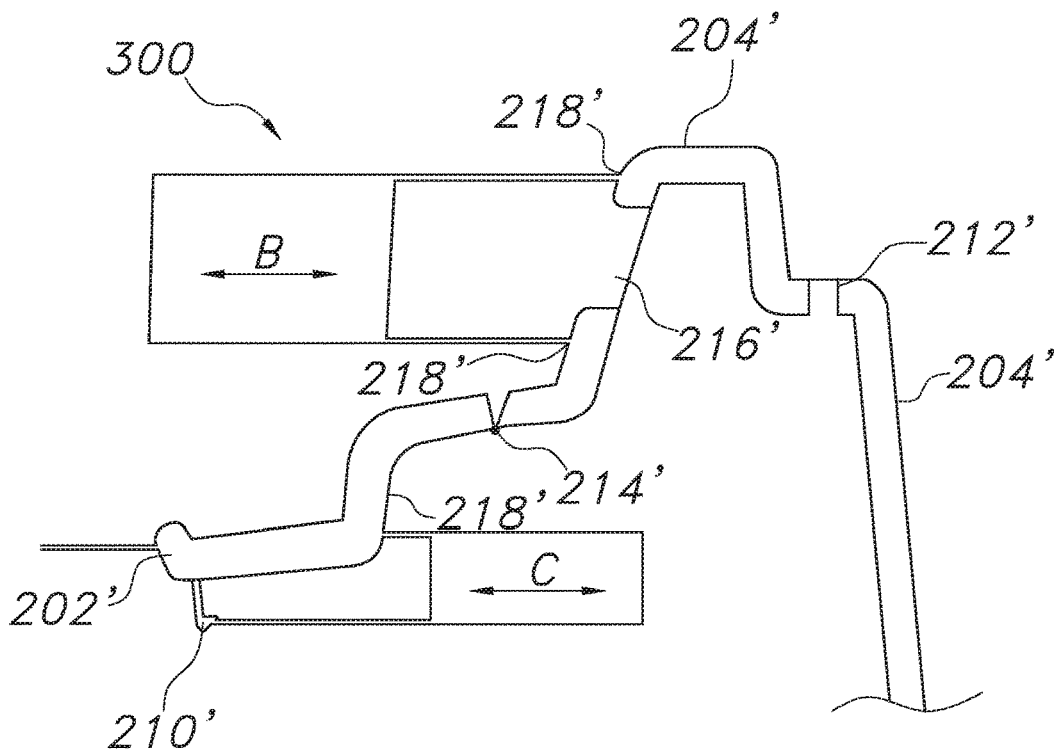
FIG. 3 depicts a mold and tooling for fabricating the storage bin shell of FIG. 2.

Tooling 300 for providing the console storage bin shell 200 such as by an injection and/or compression molding process is depicted in FIG. 3. As is known, during injection molding a portion of the tool exerts a reciprocating pressing action to force the heated molding material (typically a suitable thermoplastic polymer) into a mold cavity defining the to-be-molded part. As shown in FIG. 3, material is forced into the cavities defining the console bin shell 200 components as described above in the discussion of FIG. 2. In FIG. 3, the mold cavities are given like reference numerals to the elements of the console storage bin shell 200 but include the designation "'" for clarity. The hinged portion cavity 214" is defined by the cavity portion of the tooling 300. A first tooling 300 action (designated by arrow B) forces the heated molding material to define the latch opening 216, main bin member 204, and the main bin member receiver 212. A second tooling 300 action (see arrow C) forces the heated molding material to define the close-out member 202 and retainer 210.

As is known, injection or compression molding processes such as depicted in FIG. 3 result in a finished piece including witness lines (also called parting lines) resulting from minute misalignments, wear, gaseous vents, clearances for adjacent parts in relative motion, and/or dimensional differences of mating mold surfaces contacting the injected thermoplastic polymer. Such witness lines can detract from the aesthetic appearance of a molded piece, in turn leading to customer dissatisfaction with the appearance of the piece. Because such witness lines are substantially unavoidable, skilled mold and part designers typically attempt to position witness lines in areas which are or can be hidden from view for aesthetic reasons.

Figure 4:
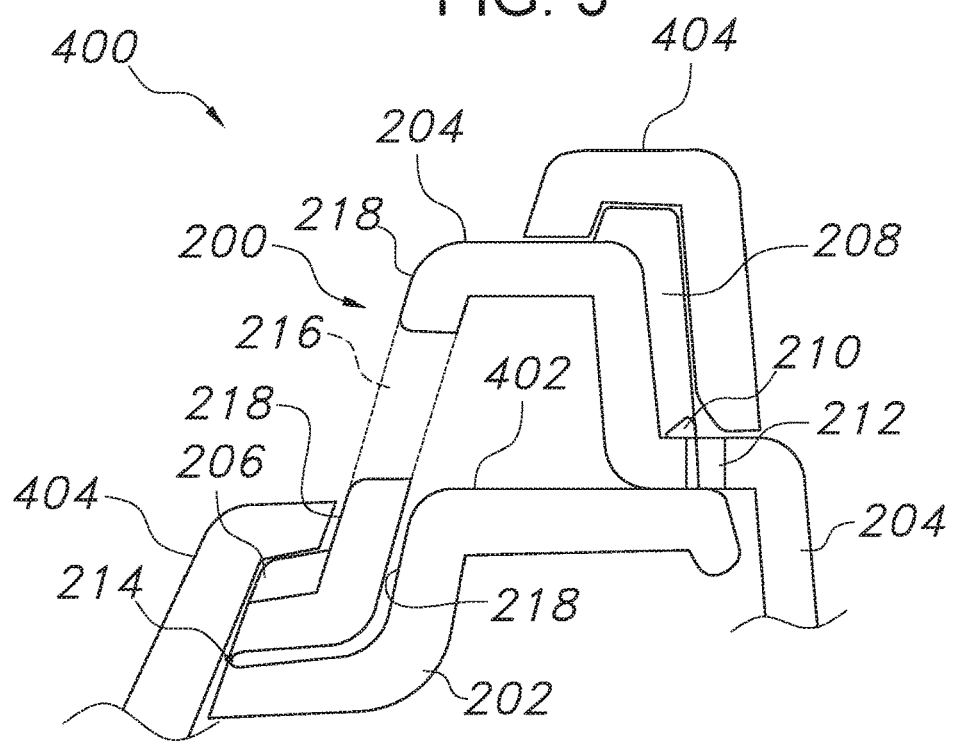
FIG. 4 depicts the storage bin shell of FIG. 2 incorporated into a vehicle storage compartment.
Figure 5:
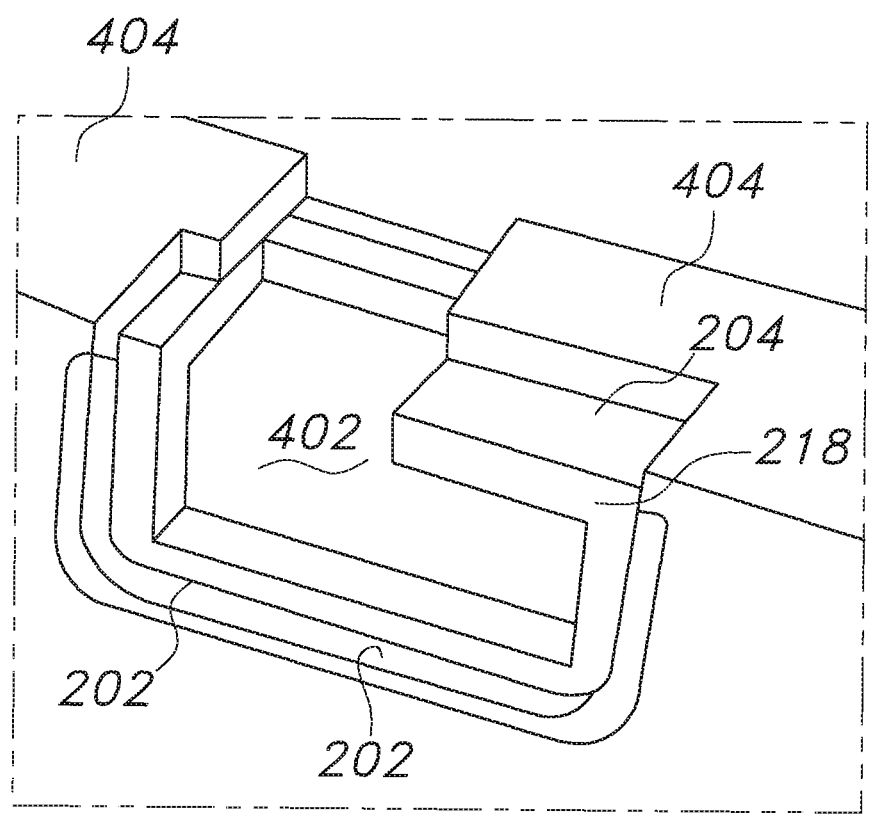
FIG. 5 depicts a latch opening of a storage bin, including the storage bin shell of FIG. 4.

Advantageously, by use of the tooling depicted in FIG. 3 many of the created witness lines 218 are substantially hidden from view on completion/assembly of the molded console storage bin shell 200, in certain cases without requiring covering panels. A completed console bin 400 including a console storage bin shell 200 is shown in FIG. 4. As described, the close-out member 202 is folded/rotated/pivoted such that retainer 210 engages main bin member receiving element 212, thereby defining a floor 402 for the latch opening 216 without requiring a separate and separately molded piece. A top finish trim panel 404 is disposed on tuning rib elements 206, 208 to provide a suitable spaced engagement. As will be appreciated, tuning rib elements 206, 208 may be altered as to length, thickness, and other dimensions to accommodate top finish trim panels 404 of differing dimensions, such as in accordance with differently sized console bins 400 intended for different models of vehicle. By the design of the console bin shell 200/close-out member 202 as described, all but one of the witness lines 218 is obscured from a user's view in the assembled bin 400. This is shown in FIG. 5, providing a user view of the latch opening 216.

Thus, a console bin latch area close-out is provided that is substantially integral with the remainder of the bin construction, providing convenience and cost savings in manufacture, required tooling, and reduced labor. As a further advantage, most of the witness lines created during the molding process resulting in the described close-out are hidden in the completed console bin, improving aesthetic appearance and desirability to the customer.

Obvious modifications and variations are possible in light of the above teachings. All such modifications and variations are within the scope of the appended claims when interpreted in accordance with the breadth to which they are fairly, legally and equitably entitled.

What is claimed:

1. A storage bin shell for a vehicle, comprising a bin portion defining a latch opening and an integral member including a hinged portion configured to provide a latch opening close-out.

2. The storage bin shell of claim 1, wherein the hinged portion defines a living hinge.

3. The storage bin shell of claim 1, wherein the hinged portion further includes a retainer for engaging a co-operating receiver defined in the bin portion.

4. The storage bin shell of claim 3, wherein the integral member hinged portion is configured for rotating or folding whereby engaging the co-operating receiver by the retainer defines the latch opening close-out.

5. The storage bin shell of claim 4, wherein rotating or folding the hinged portion to engage the co-operating receiver by the retainer defines the latch opening close-out.

6. A vehicle including the storage bin shell of claim 1.

7. A vehicle center console including a latching storage bin, comprising:
   a hinged storage bin lid;
   a latching mechanism; and
   a bin portion defining a latch opening and an integral member including a hinged portion configured to provide a latch opening close-out.

8. The console of claim 7, wherein the hinged portion defines a living hinge.

9. The console of claim 7, wherein the hinged portion further includes a retainer for engaging a co-operating receiver defined in the bin portion.

10. The console of claim 9, wherein the integral member hinged portion is configured for rotating or folding whereby engaging the co-operating receiver by the retainer defines the latch opening close-out.

11. The console of claim 10, wherein rotating or folding the hinged portion to engage the co-operating receiver by the retainer defines the latch opening close-out.

12. A vehicle including the console of claim 7.

13. A method for manufacturing a storage compartment shell for a vehicle console, comprising defining a bin portion having a latch opening and an integral member including a hinged portion configured to define a latch opening close-out.

14. The method of claim 13, including providing the hinged portion defining a living hinge.

15. The method of claim 13, including providing the hinged portion further including a retainer and the bin portion including a co-operating receiver for engaging the retainer.

16. The method of claim 15, including rotating or folding the hinged portion whereby the retainer engages the co-operating receiver to define the latch opening close-out.

17. The method of claim 13, including providing the bin portion and integral member by a molding process.

\* \* \* \* \*